Oct. 23, 1945.    G. E. HAMILTON    2,387,441
ATTACHMENT FOR PICTURE PROJECTING APPARATUS
Filed March 8, 1943
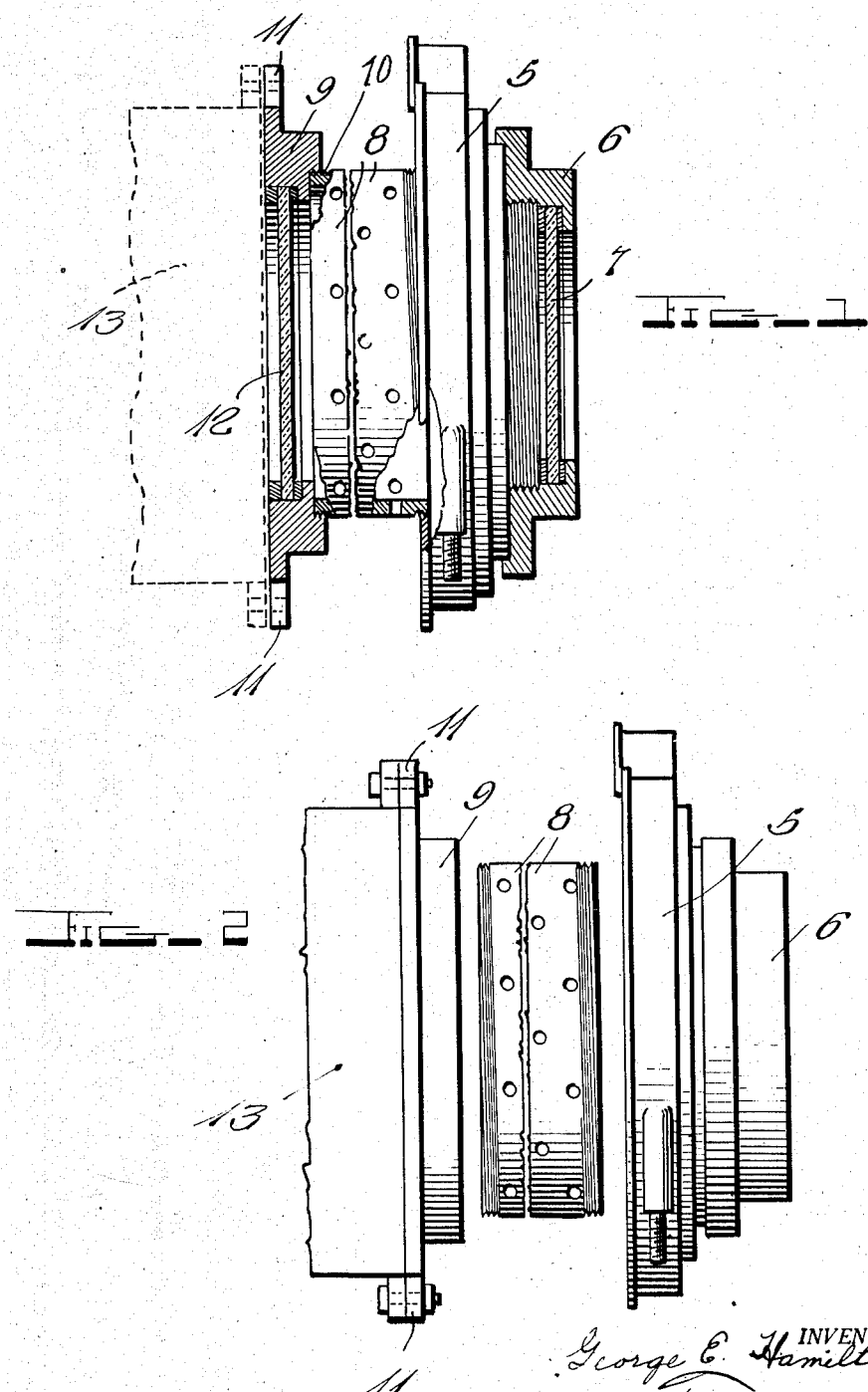
INVENTOR,
George E. Hamilton,
BY Frank S. Appleman
ATTORNEY.

Patented Oct. 23, 1945

2,387,441

UNITED STATES PATENT OFFICE 2,387,441

ATTACHMENT FOR PICTURE PROJECTING APPARATUS

George E. Hamilton, Meadville, Pa., assignor to Keystone View Company, Meadville, Pa., a corporation of Pennsylvania Application March 8, 1943, Serial No. 478,409

1 Claim. (Cl. 88—24)

This invention relates to light shutters such as are employed in photography and in picture projecting machines where the shutter is intermittently operated to interrupt the passage of light or to afford passage of light from a light source through a lantern slide, film, or the like, to be projected for display of the picture.

It is well known that in picture projecting machines a light of high intensity is employed which, by its heat, injuriously affects photographic shutters and the metal bearings in the casings employed for interrupting the passage of light.

It is an object of this invention, therefore, to provide novel means associated with a light shutter and with the light source whereby heat from the light source is dispensed or dispersed to a degree that the resultant temperature of the heat reaching the shutter or shutter casing will be so low that it will not seriously affect the shutter or bearings or tend to warp the sections of the shutter which, as is well known, are of relatively thin metal segments oscillatively mounted and moved by the means heretofore stated.

It is an object of the invention, therefore, to provide a shutter of the character indicated, having a connected air chamber of appropriate length, which air chamber has ventilating apertures in it so that by the circulation of air through the apertures, the heat referred to is radiated and carried away from the chamber; and it is a feature of the invention that the end of the chamber remote from the shutter is connected to the lantern or light source by means which permits the ready assembly of the shutter and the said light source.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:

Figure 1 illustrates a view in elevation, partly in section, of a light shutter associated with the ventilating chamber, the said ventilating chamber being associated with means by which it is removably attached to the lantern or light source; and Figure 2 illustrates a view in elevation of the assembly at the end of the ventilating chamber remote from the shutter, showing a means of attaching the shutter to the light source.

In this drawing 5 denotes a shutter casing on the outer face of which a ring 6 is threaded, and the said ring encloses a glass plate 7 which protects the shutter from access of dust or the like, and on the inner face of the shutter casing which has an aperture therein, the ventilating chamber 8 is threaded in said aperture. The ventilating chamber is shown as having a plurality of apertures which permits circulation of air into and out of the said chamber. At the end of the ventilating chamber remote from the shutter a ring 9 is applied to said ventilating chamber and, under certain conditions, a joint 10 may be formed between them. The periphery of the ring may be provided with a plurality of apertured ears 11 to receive fastenings such as screws, by which the ring is attached to a lantern 13 for illuminating a lantern slide or film. The ring 9 holds a glass plate 12 which is usually present in assemblies of this character, and the plates referred to are held in place by conventional forms of packing or retaining means which, it is thought, need not be described in detail.

The ventilating chamber 8 is shown as broken away for an indeterminate length as it is obvious that the ventilating chamber will have to be made proportional to other elements of the combination so that it will be adapted for use in connection with illuminating devices or lanterns of different sizes having lighting means of different intensities.

While detachable joints have been shown between certain units of the installation, it is obvious that the means of assembly may be varied within predetermined bounds without departing from the embodiment as illustrated and described.

I claim:

In a picture projecting apparatus having a lantern, a ring having an internal glass plate, means for anchoring the ring on the lantern, a shutter casing spaced from the lantern, a ventilating apertured tube having detachable joints with the ring and shutter casing, respectively, the said ventilating tube forming an open duct between the ring and shutter casing for dispelling the heat of the lantern and preventing injury to a shutter and its blades within the casing.

G. E. HAMILTON.